United States Patent [19]

Ely et al.

[11] 3,866,045
[45] Feb. 11, 1975

[54] NIGHT VISION DEVICE

[75] Inventors: Richard E. Ely, Huntsville; Raymond W. Conrad, Russellville, both of Ala.

[73] Assignee: The United States of America as represented by the Secretary of the Army, Washington, D.C.

[22] Filed: Nov. 27, 1973

[21] Appl. No.: 416,904

Related U.S. Application Data

[63] Continuation-in-part of Ser. No. 179,216, Sept. 9, 1971, abandoned.

[52] U.S. Cl. .............................................. 250/331
[51] Int. Cl. .............................................. G01j 1/48
[58] Field of Search ..................... 250/331, 339, 342

[56] References Cited
UNITED STATES PATENTS 3,410,999  11/1968  Fergason ...................... 250/331 X
3,569,709  3/1971  Wank ................................ 250/331

Primary Examiner—Eli Lieberman
Assistant Examiner—Davis L. Willis
Attorney, Agent, or Firm—Edward J. Kelly; Herbert Berl; James T. Deaton

[57] ABSTRACT

A night vision device in which a screen has a layer of cholesteric material that is heated to the critical value for maximum extinction of a source of circularly polarized monochromatic light. The screen is irradiated with a source of circularly polarized monochromatic light that is attenuated by said cholesteric material until infrared rays from an object are focused onto the screen to cause localized heating of the cholesteric material and thereby passage of the circularly polarized monochromatic light to an opposite face of the screen. The monochromatic light passing to the opposite face of the screen is viewed as an image of the object.

5 Claims, 1 Drawing Figure

PATENTED FEB 11 1975 3,866,045
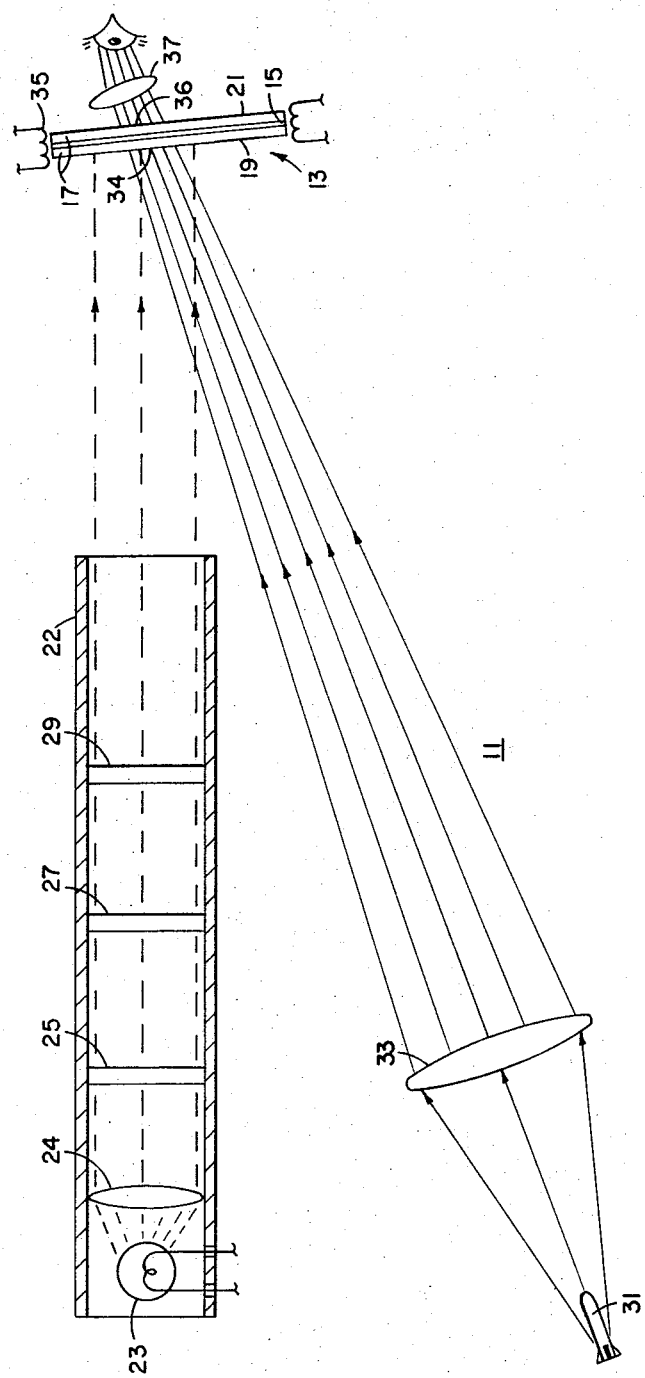
Raymond W. Conrad
Richard E. Ely,
INVENTORS

NIGHT VISION DEVICE

CROSS REFERENCE TO RELATED APPLICATION

This application is a continuation-in-part of applicants co-pending application Ser. No. 179,216, filed Sept. 9, 1971 now abandoned.

BACKGROUND OF THE INVENTION

Prior art night vision devices employ cholesteric transmission screens irradiated with scattered white light to produce a colored presentation of the object. Changes in wavelengths of less than 100°A are not apparent in the screen presentation and even this resolution can only be obtained by maintaining the temperature of the cholesteric material within extremely close tolerances. An increase of white light intensity to increase image intensity tends only to reduce contrast and "wash out" the image.

SUMMARY OF THE INVENTION

A device for night vision of an object in which the device has a screen with a layer of cholesteric material to provide a positive presentation of an object on one of the outer surfaces of the screen. The cholesteric material of the screen is maintained at a critical temperature by heating means. The opposite surface of the screen is irradiated with circularly polarized monochromatic light that is attenuated by the cholesteric material when maintained at its critical temperature. An infrared image of an object is focused on the opposite surface of the screen to cause localized heating of the cholesteric material to cause the cholesteric material to obtain a temperature above the critical temperature for maximum circular dichroism of the monochromatic light and thereby allow the circularly polarized monochromatic light to pass through the screen to the first surface to present a focused image of the object that can be viewed through a lens by the naked eye.

The circularly polarized monochromatic light passing through the screen is increased or reduced by a factor of 10 for 100°A shifts in wavelength in the image caused by the infrared rays from the object. An intensity ratio of 10 to 1 is readily apparent in the secreen presentation.

BRIEF DESCRIPTION OF THE DRAWING

The single FIGURE of the drawing is a schematic view partially in section of the preferred embodiment according to this invention.

DESCRIPTION OF THE PREFERRED EMBODIMENT

Referring now to the drawing, a night vision device 11 in illustrated that includes a presentation screen 13 that is provided with a layer 15 of cholesteric material (liquid crystals) and glass plate faces 19 and 21. Heating coils 35 adjacent screen 13 maintain cholesteric material 15 at the critical temperature required for maximum circular dichroism at the wavelength of the monochromatic light focused thereon for maximum absorption thereof.

A light tube 22 includes a source of light 23, a lens 24, a filter 25, a polarizer 27 and a quarter wave plate 29. Light from source 23 is filtered to produce monochromatic rays, circularly polarized in the direction compatible with the particular cholesteric material of layer 15 and directed by tube 22 to irradiate screen face 19. An infrared image in the form of infrared rays of an object 31 is produced by an infrared transmitting lens 33 made of, e.g., IRtran, sapphire, $CaF_2$, etc. The infrared image from lens 33 is focused onto the cholesteric material 15 of screen 13 as an image 34 of object 31. The infrared rays from object 31 produce localized heating of the cholesteric material, shifting the wavelength for maximum circular dichroism. The cholesteric material is initially opaque to the monochromatic light due to its being maintained at the critical temperature, but becomes transparent when the infrared image is focused thereon to thus allow a viewer to see the image of the object in monochromatic light that passes through the cholesteric material. The monochromatic light passing through the cholesteric material provides a positive presentation 36 of object 31 on screen face 21. The presentation is then viewed through lens 37. Intensity of presentation 36 varies by a factor of 10 for 100°A to present contrasts in the presentation readily apparent to the human eye. An intensity ratio of 10 to 1 is readily apparent in the screen presentation.

As a specific example, the cholesteric material can be for example a film about one mil thick of a mixture of 20 percent by weight cholesteryl acetate and 80 percent by weight cholesteryl nonanoate, between thin glass plates 17. The temperature of plates 17 and the particular cholesteric materials specified hereinabove are maintained at 25°C. This the critical temperature of the particular material for maximum attenuation of left circularly polarized monochromatic radiation that has a wavelength centered about 5800°A. The left hand circularly polarized monochromatic radiation centered about 5800°A can be produced in light tube 22 by using a bright, tungsten-filament lamp 23. Light from lamp 23 is collected and collimated by an ordinary glass lens 24 and passed through an interference filter 25 designed to transmit radiation in a very narrow wavelength region centered about 5800°A. This monochromatic radiation is then linearly polarized by passage through a polarizer 27 which may be a conventional inexpensive plastic type. The linearly polarized radiation is then passed through quarter wave plate 29, which may be made either of thin sheets of mica or a plate of quartz cut parallel to the optic axis. Quarter wave plate 29 is oriented at an angle of 45° to the incident radiation. The transmitted radiation from tube 22 emerges as left circularly polarized monochromatic light.

In operation of the device when using the particularly defined materials supra, the 20 percent by weight cholesteryl acetate and 80 percent cholesteryl on plates 17 are maintained by heating coils 35 at 25°C. The left circularly polarized monochromatic radiation emerging from tube 22 and focused onto face 19 and the particular cholesteric material is absorbed by the cholesteric material until infrared radiation from lens 33 is focused onto the cholesteric material. Focusing of the infrared radiation on the cholesteric material causes localized heating of the cholesteric material and thereby passage of the left circularly polarized monochromatic radiation through the cholesteric material to produce an image of object 31 on screen face 21 that can be readily viewed by the naked eye through lens 37.

It is to be understood that many other cholesteric materials (liquid crystals) other than the ones pointed out above can be used in this invention and other monochromatic light than that of the wavelength pointed out in the example herein can be used. The particular wavelengths used will depend upon the wavelength attenuated by the particular cholesteric material at its critical temperature.

We claim:

1. A device for night vision of an object comprising: a screen with a layer of cholesteric material therein provided with one face for presentation and an opposite face for visible irradiation, a tube mounted relative to said screen for irradiation of said opposite face with circularly polarized monochromatic light, means for heating the layer of cholesteric material to the critical temperature for maximum attenuation of said circularly polarized monochromatic light, and means for focusing on said opposite face infrared rays from an object to provide an image thereof on said presentation face.

2. A night vision device as set forth in claim 1, wherein said screen includes a pair of glass plates for inclosing said layer of cholesteric material to provide the opposite faces of the screen.

3. A night vision device as set forth in claim 2, wherein said tube includes a light source, a filter, a polarizer, and a quarter wave plate in series relation with said opposite face for irradiation of said opposite face with circularly polarized monochromatic light.

4. A night vision device as set forth in claim 1, wherein said cholesteric material is about 20 weight percent cholesteryl acetate and 80 weight percent cholesteryl nonanoate.

5. A night vision device as set forth in claim 4, wherein said tube includes a tungsten-filament light source, a glass lens, an interference filter for passing wavelength region centered about 5800°A, a polarizer, and a quarter wave plate oriented at an angle of 45° to the incident radiation with all of said elements being in series relation in said tube.

* * * * *